Nov. 26, 1957      E. H. REIK      2,814,288

HEATER FOR CANNED FOOD

Filed May 17, 1954

INVENTOR.
Ella H. Reik
BY Wood, Herron + Evans,
Attorneys.

United States Patent Office 2,814,288
Patented Nov. 26, 1957

2,814,288

HEATER FOR CANNED FOOD

Ella H. Reik, Cincinnati, Ohio

Application May 17, 1954, Serial No. 430,050

3 Claims. (Cl. 126—263)

This invention is directed to a new article of manufacture which is designed to heat canned foods by means of water activated exothermic materials. The invention also concerns, as an article of manufacture, a packaged food heater of the type set forth.

The present application is a continuation-in-part of my copending patent application, Serial No. 270,157, filed February 6, 1952, now abandoned.

It is one of the objectives of the invention to provide an article of the type described which is adapted to accommodate a wide variety of different shapes and sizes of cans in which food is packaged. In the fulfillment of this objective, I provide a food heater which is adapted to be wrapped tightly around a can of food to conform to its contours. When thus wrapped around a can, the food heater completely seals in the can so that little of the heat generated upon the activation of the exothermic chemicals is lost.

It is a further objective of the invention to provide an article of the type set forth which may be folded up into a small and compact package substantially no larger than an ordinary wallet, so that it may be carried handily in a person's pocket. The small size of the heater also makes it possible, from a practical point of view, to package one or more heaters in a box or carton of canned rations of the type issued to members of our Armed Forces.

Another objective of the invention is to provide an article of the type set forth which is adapted to be manufactured in continuous strip form, and the individual heater units being cut from the continuous strip, in order to reduce manufacturing costs.

The food heater which is the subject of the invention is particularly well suited for use by troops in the field for heating canned rations and the like. However, it is not limited to this particular use, and it will be seen that it may be used on any occasion to heat canned or packaged foods where it is either impractical or impossible to provide or obtain ordinary heater facilities.

In the preferred embodiment the article comprises a strip of metal foil to which is affixed a plurality of rectangular, water activated exothermic pads. These pads are disposed in a pattern which permits the sheet to be folded to bring the pads one on top of the other so that when the sheet is completely folded up it is approximately the same length and width as one of the pads. In use, the sheet is simply wrapped around the food or container to be heated, the exothermic pads moistened, and then the edges of the metal foil crimped together to completely enclose the food. The heat produced upon the activation of the pads is thus confined and, when a bright metal foil such as aluminum is used, little heat is lost through radiation. By entirely enclosing the food a surprisingly small amount of exothermic material is required, or as incorporated in the article, a surprisingly small number of pads of exothermic material is required.

The invention also contemplates a heater in which an absorbent sheet of paper or other material is provided to prevent chemical saturated water from leaking out of the heater when it is being used.

Other features and advantages of the invention will be readily apparent to those skilled in the art from the following description of the drawings in which.

Figure 1:
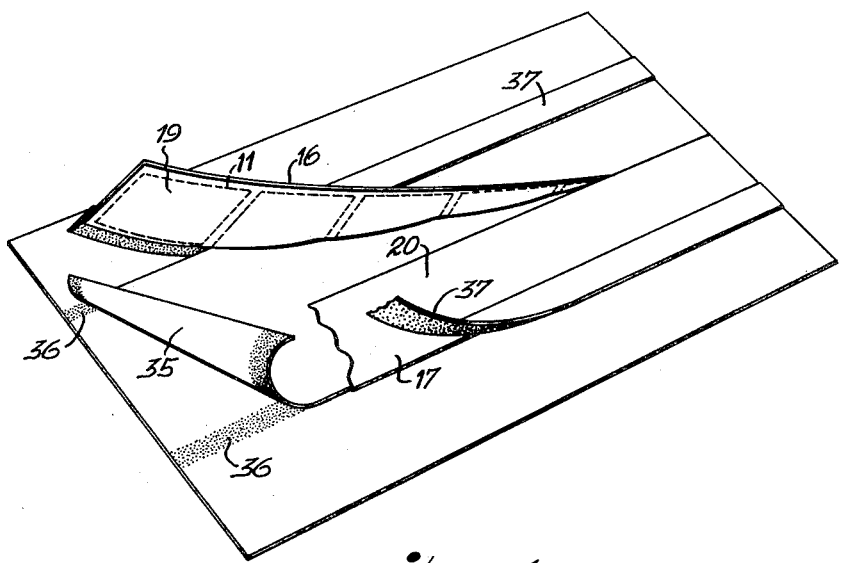
Figure 1 is a perspective view illustrating a preferred embodiment of the invention. In this view certain of the parts are broken away for clarity.

Referring to Figure 1, a rectangular sheet of metal foil is indicated at 10. Preferably the sheet is made from aluminum foil, this material having the requisite strength characteristics and being a bright metal reduces radiation heat losses to a minimum.

Heat is supplied by pads 11 which may include water activated exothermic materials of the type described in U. S. Patents No. 2,384,720, No. 2,239,410 or any other of the well known mixtures available commercially. Preferably, the chemicals of the mixture are enclosed in an envelope of paper or other material which will permit the ready passage of water. The pads should be substantially flat or thin. It is preferred that the pads be affixed to the metal foil sheet by an adhesive which is water resistant, adhesives of this sort also being well known and available commercially. The amount of chemicals used in the pads and the number of pads used is, of course, dependent upon the efficiency of the chemical mixtures. However, it is believed to be well within the knowledge of those skilled in the art to select the proper mixture for any one embodiment of the invention, inasmuch as the amount of heat required is a factor dependent upon the particular use to which the article is to be put.

Figure 1 shows a form of my heater in which the exothermic chemical pads are provided in strip form. Two such strips are utilized; one being indicated by the numeral 16 and the other by the numeral 17. The individual pads 11 in each of these strips are indicated by the dotted lines. Each strip of pads comprises a band of water absorbent paper or cellulosic material 19 on one side thereof and a band of thin aluminum foil 20 on the opposite side thereof. The two bands are adhesively joined along both edges, at the ends and at equally spaced intervals along transverse lines to define a plurality of rectangular pockets which are disposed lengthwise of the strip.

Figure 2:
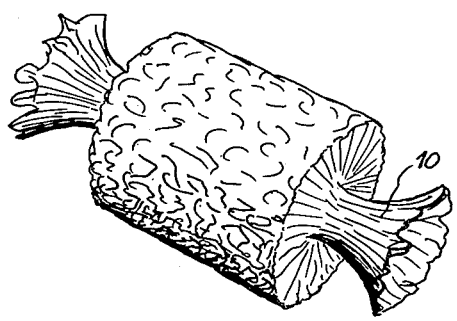
Figure 2 is a perspective view illustrating the heater of this invention as it appears when wrapped around a can of food.

An auxiliary sheet 35 of moisture absorbent material is affixed to sheet 10 in the central area thereof. Adhesive 36 may be used, this adhesive being applied to two longitudinal side edges of absorbent sheet 35. The absorbent side 19 of the two strips 16 and 17 respectively are placed face down against the absorbent sheet 35 and are hinged to it along their respective opposite side edges by means of adhesive tape 37. This permits the two strips of pads to be swung up away from one another so that water may be applied to their moisture absorbent faces. After water is applied, the two strips may be laid down and a can of food rolled up in the heater by placing it across the central area at one end covering the pads and then wrapping the heater around it. After this the free edges of the foil may be crimped together at the two ends of the can as shown in Figure 2. This particular embodiment has the advantage that the foil side of the strips is against a can of food to protect it against toxic products, and the moisture absorbent sheet 35 and pads are entirely enclosed to prevent escape of soluble toxic products.

In the embodiment of the invention disclosed the thin individual pads are disposed in a spaced pattern which permits the outer sheet to be folded up at places between pads to provide a small packet which may be enclosed within a protective envelope which is sufficiently small to be carried readily in a pocket.

The heater of the present invention has a number of advantages and features not found in exothermic food heating devices of the past. The absorbent pad 35 insures that toxic materials formed upon activation of the pads do not escape. Furthermore, a can of food enclosed within the heater when it is crimped as shown in Figure 2 is in contact with the foil sides of the strips of exothermic pads so that it does not become fouled by the toxic products of the chemical reaction. Additionally, the heater is adapted to accommodate itself to a wide variety of differently shaped and different sizes of cans.

Having described my invention, I claim:

1. Means for heating a can of food in the field, said means comprising a rectangular sheet of aluminum foil which is adapted to be crumpled readily by hand, a rectangular sheet of water absorbent material adhesively affixed to the longitudinal central area of said sheet of metal foil leaving substantial marginal portions of said sheet of foil at the respective opposite longitudinal side edges of said sheet of water absorbent material free, a pair of strips, each strip of the pair consisting of an inner water absorbent sheet and an outer water impervious sheet, the respective inner and outer sheets being adhesively affixed to one another along their respective longitudinal side edges, their ends and at transverse lines which are spaced equally longitudinally of the strip to provide a plurality of substantially thin, rectangular pockets, water activated exothermic material enclosed within each of said pockets, each of said strips being substantially one-half as wide as said water absorbent sheet, the respective strips laying side by side and extending longitudinally of and covering the sheet of water absorbent material with the water absorbent sheets of the strips against said rectangular sheet of water absorbent material, and means to hinge each strip to the sheet of metal foil at the outer longitudinal side edge thereof, whereby said strips may be raised to apply water to the water absorbent sheet thereof in order to activate said exothermic material.

2. Means for heating a can of food in the field, said means comprising a rectangular sheet of aluminum foil which is adapted to be crumpled readily by hand, a rectangular sheet of water absorbent material adhesively affixed to the longitudinal central area of said sheet of metal foil leaving substantial marginal portions of the sheet of foil at the respective opposite longitudinal side edges of said sheet of water absorbent material free, a strip consisting of a water absorbent facing and a water impervious facing, the respective facings being adhesively affixed to one another along their respective longitudinal side edges, their ends and at transverse lines which are spaced equally longitudinally of the strip to provide a plurality of substantially thin, rectangular pockets, water activated exothermic material enclosed within each of said pockets, said strip extending longitudinally of the sheet of water absorbent material with the water absorbent face thereof placed against said water absorbent sheet, and means to hinge said strip to the sheet of metal foil at a longitudinal side edge thereof whereby said strip may be raised to apply water to the water absorbent face thereof in order to activate said exothermic material.

3. Means for heating a can of food in the field, said means comprising a rectangular sheet of aluminum foil which is adapted to be crumpled readily by hand, a rectangular sheet of water absorbent material adhesively affixed to the longitudinal central area of said sheet of metal foil to leave substantial marginal portions of the foil free, a pair of strips, each strip of the pair consisting of an inner, water absorbent facing and an outer water impervious facing, the respective inner and outer facings being adhesively affixed to one another along their respective longitudinal side edges, their ends and at transverse lines which are spaced equally longitudinally of the strip to provide a plurality of substantially thin rectangular pockets, water activated exothermic material enclosed within each of said pockets, each of said strips being substantially one-half as wide as said water absorbent sheet, the respective strips laying side by side and extending longitudinally thereof to substantially cover said sheet of water absorbent material, said strips disposed with their water absorbent facings placed against said water absorbent sheet, and adhesive tape hinging each strip to the sheet of metal foil at the outer longitudinal side edge thereof, whereby said strip may be raised to apply water to the water absorbent facing thereof.

References Cited in the file of this patent

UNITED STATES PATENTS

| | | |
|---|---|---|
| 858,848 | Allison | July 2, 1907 |
| 1,806,007 | Watts | May 19, 1931 |
| 1,894,798 | Seward | Jan. 17, 1933 |
| 2,168,219 | Lakenbach | Aug. 1, 1939 |
| 2,239,410 | Bonat | Apr. 22, 1941 |
| 2,384,720 | Babcock | Sept. 11, 1945 |
| 2,589,645 | Tiegel | Mar. 18, 1952 |
| 2,596,664 | Durham | May 13, 1952 |
| 2,710,008 | Jensen | June 7, 1955 |

FOREIGN PATENTS

| | | |
|---|---|---|
| 779,846 | France | Apr. 13, 1935 |